(12) United States Patent
Mead

(10) Patent No.: US 8,144,413 B2
(45) Date of Patent: Mar. 27, 2012

(54) REDUCED INSTRUCTION SET COMPUTER (RISC) PROCESSOR BASED DISK MANAGER ARCHITECTURE FOR HARD DISK DRIVE (HDD) CONTROLLERS

(75) Inventor: John P. Mead, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 1257 days.

(21) Appl. No.: 11/840,577

(22) Filed: Aug. 17, 2007

(65) Prior Publication Data

US 2008/0270755 A1 Oct. 30, 2008

Related U.S. Application Data

(60) Provisional application No. 60/926,905, filed on Apr. 30, 2007.

(51) Int. Cl.
*G11B 20/10* (2006.01)
*G06F 13/00* (2006.01)

(52) U.S. Cl. .......................................... 360/39; 711/112
(58) Field of Classification Search ................... None
See application file for complete search history.

(56) References Cited

U.S. PATENT DOCUMENTS

| 5,610,808 A | 3/1997 | Squires et al. | |
|---|---|---|---|
| 2008/0005749 A1* | 1/2008 | Mead et al. | 719/321 |

FOREIGN PATENT DOCUMENTS

| CN | 1519846 A | 8/2004 |
|---|---|---|
| KR | 10-0245896 | 3/2000 |
| WO | 9209036 A1 | 5/1992 |

OTHER PUBLICATIONS

Charles Kirtland, Brian Wolf, "Programmable, Single-Chip Controller Adapts to Different System Environments," Electro. Electronic Conventions Management, vol. 11, No. 21, 1986, Los Angeles, USA, pp. 1-9.

* cited by examiner

*Primary Examiner* — Daniell L Negron
*Assistant Examiner* — Regina N Holder
(74) *Attorney, Agent, or Firm* — Garlick & Markison; Shayne X. Short

(57) ABSTRACT

Reduced instruction set computer (RISC) processor based disk manager architecture for HDD (Hard Disk Drive) controllers. Disk manager operations of a HDD are off-loaded from a main processor to a dedicated RISC processor. The main processor is operable to provide higher level instructions to the RISC processor, and the RISC processor is operable to translate those higher level instructions into bit level instructions that are subsequently provided to one or more control engines that is then operable to execute those bit level instructions to perform one or more channel interfacing protocol control functions that can include any one or more of low level timing for servo demodulation, timing for data formatting operations, media control operations, transfer control operations, and/or other disk manager related functions.

20 Claims, 9 Drawing Sheets

REDUCED INSTRUCTION SET COMPUTER (RISC) PROCESSOR BASED DISK MANAGER ARCHITECTURE FOR HARD DISK DRIVE (HDD) CONTROLLERS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 60/926,905, entitled "Reduced instruction set computer (RISC) processor based disk manager architecture for hard disk drive (HDD) controllers,", filed Apr. 30, 2007.

Incorporation by Reference

The following U.S. Utility patent applications are hereby incorporated herein by reference in their entirety and made part of the present U.S. Utility patent application for all purposes:

1. U.S. Utility patent application Ser. No. 11/444,584, entitled "Hard disk drive progressive channel interface,", filed Jun. 1, 2006, pending.

2. U.S. Utility patent application Ser. No. 11/444,583, entitled "Hard disk controller having multiple, distributed processors,", filed Jun. 1, 2006, pending.

BACKGROUND OF THE INVENTION

1. Technical Field of the Invention

The invention relates generally to devices that include a hard disk drive (HDD); and, more particularly, it relates to management of the various functions that are performed within such devices that include a HDD.

2. Description of Related Art

As is known, many varieties of memory storage devices (e.g., disk drives/HDDs), such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Within prior art HDD systems, there are several systems that operate simultaneously and require the allocation of a certain degree of processing resources. In prior art HDD systems, a singular processor is typically provisioned in an effort to service these various systems. More specifically, prior art HDD controllers rely on a main processor to do multiple hard real-time control functions. In prior art HDD systems, either the performance of the overall system suffered or the firmware complexity is greatly increased in these prior art implementations that seek to perform all of these functions using the single processor.

There is a deficiency in the prior art, in that, the current means of servicing the various functionality required within a device that includes a HDD generally requires an inordinate amount of involvement by a main/single processor that is implemented to perform a wide variety of functions, many of which are consumptive of a majority the main processor's capability and processing resources.

FIG. 5 illustrates a prior art embodiment of an apparatus 500 that employs a single processor to service multiple control loops. The apparatus 500 includes a prior art HDD controller integrated circuit (IC) 560. The host interface 502 is controlled with a host manager module 570 that is operable to move data between the host interface 502 and a buffer (typically external to the HDD controller IC 560) through the buffer manager module 567. The channel 531 of the HDD communicates with the preamp interface 501. The disk manager module 512 controls the channel 531 and moves data between the channel 531 and the buffer through the buffer manager module 567. The buffer manager module 567 arbitrates access to the shared buffer implemented in the DRAM (typically external to the HDD controller IC 560).

Within this prior art apparatus 500, all firmware executes on a single processor 562, which controls the host manager module 570 and disk manager module 512. Cached firmware for the processor 562 may be stored in the DRAM and be accessed through the buffer manager module 567.

The disk manager module 512 typically has a small writable control store to implement a programmable state machine for control of the hardware within the disk manager module 512 and the channel interface (e.g., the channel 531 and the preamp interface 501). Depending on the complexity of the host interface 502, the host manager 570 may have state machines or have a small writable control store to perform its real-time control functions. The processor 562 loads appropriate micro-programs into the control store(s) depending on the desired modes of operation.

As can be seen when considering this embodiment, there are many functions which must be performed within such a HDD controller IC 560. By requiring all of these functions to be supported by the processor 562, certain of the functions will be short-changed with respect to processing capability at certain times. For example, the processor 562 certainly needs to support more than one function in this embodiment, and when a majority (or all) of the processing resources and capabilities of the processor 562 are being used for one of the functions, then other of the functions are not going to be serviced well. In real time applications, this manner of provisioning the processing resources to a single processor 562 can result in significantly reduced performance.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
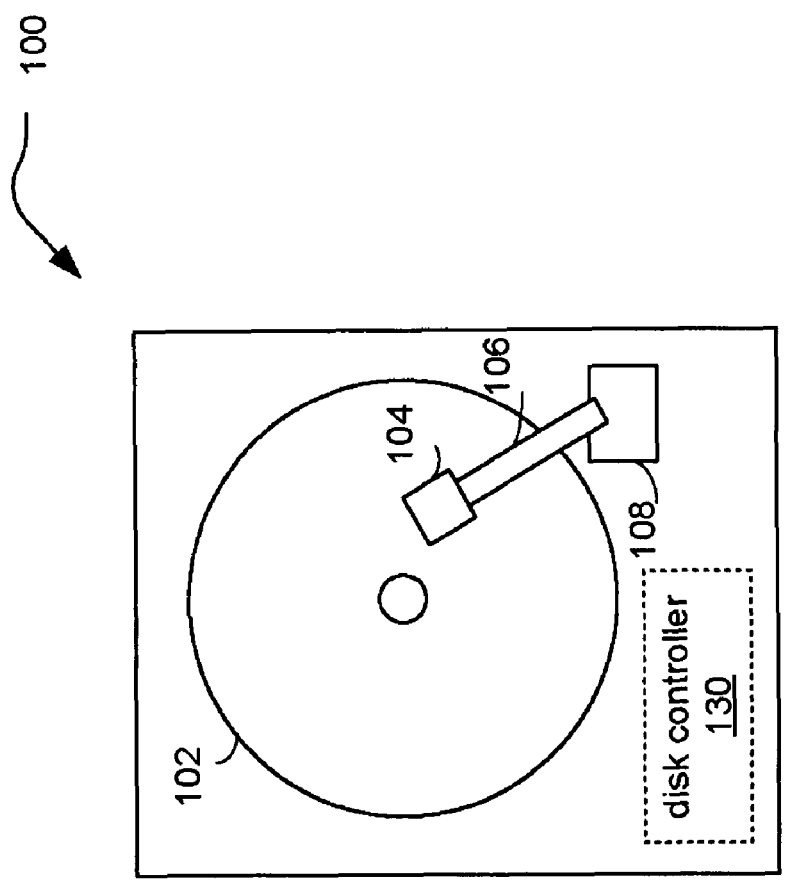
FIG. 1 illustrates an embodiment of a disk drive unit.

A novel approach is presented herein by which a reduced instruction set computer (RISC) processor is implemented within a HDD to govern disk manager operations; the HDD itself can be included within any number of devices including various communication devices. In some embodiments, the RISC processor dedicated to disk manager operations can be viewed as being a disk protocol engine (DPE).

Generally speaking, the disk manager operations of a HDD controller include some or all of the following functions: (1) controlling the formatting of servo and data transfers to/from the read channel, (2) computing the drive format, (3) performing error correction code (FCC) encoding and decoding, (4) performing reverse-ECC (permuted) modulation code encoding and decoding, (5) generating and checking cyclic redundancy check (CRC), performing defect scan packetization, (6) traversing defect lists and skip over primary defects, (7) transferring user data to and from the main buffer memory, (8) reporting errors and status, (9) triggering the release of blocks in buffer memory, (10) interrupting the servo ISR when valid servo field data is available, (11) performing self-servo write functions, and/or additional disk manager related functions as well. In prior art architectures, these disk manager related functions are controlled using hardware.

In accordance with certain aspects of the invention, a novel architecture is presented to effectuate the disk manager related operations by employing a small RISC processor to control these functions that are performed by one or more microcode engines. In some embodiments, this also involves employing one or more flexible first-in/first-out (FIFO)-based non-branching microcode engines that are interposed between the RISC processor and these one or more microcode engines; the bit level instructions are provided by the RISC processor to the one or more flexible FIFOs, and then subsequently to the microcode engines that actually execute the bit level instructions.

A main processor is also implemented within HDD and provides instructions to the RISC processor by means of a system mailbox or memory. In contrast to prior art systems in which a main processor within such a HDD performed nearly all of a wide variety of operations, including those functions which are generally very processing resource consumptive (e.g., servo control loop functions), the novel means presented herein employs a RISC processor that is dedicated to govern disk manager operations within the HDD based on instructions generated by the main processor. In prior art systems, the main processor can sometimes spend as much as one-half (or even more) of its time dealing with servo related interrupt service routines. These servo related interrupt service routines can withstand very little latency, and they undesirably also block out non-servo related functions for relatively long periods of time (e.g., non-servo related functions cannot be processed and/or dealt with during this time during which the servo related interrupt service routines are consuming all of the processing capability).

Because of this block out caused by these servo related interrupt service routines, the main processor has less ability to do real time operations. Using the novel approach of a RISC processor that is dedicated to govern disk manager operations within the HDD, the RISC processor (e.g., such as being implemented as a disk protocol engine (DPE)) is operable to perform many of the lower level channel related operations in the background. In other words, the main processor need not be so directly involved in these channel related operations at such a low level of interaction thanks to the use of the RISC processor that is dedicated to govern disk manager operations within the HDD.

The main processor in various novel embodiments included within the scope and spirit of the invention is operable to provide high level instructions to the RISC processor, and the RISC processor is operable to translate those instructions into bit level instructions and then to provide those bit level instructions (either directly or indirectly via one or more first-in/first-out (FIFO) buffers) to one or more control engines that are operable to execute the bit level instructions to perform any one or more of the various disk manager operations within the HDD. The use of the RISC processor that is dedicated to govern disk manager operations within the HDD, in conjunction with one or more control engines that is operable to execute the bit level instructions provided by the RISC processor allows for the freeing-up of the main processor. From one perspective, the main processor provides the high level instructions and the RISC processor (along with the one or more control engines) take the instructions from there, and the main processor is left to perform other functions and operations. For example, the RISC processor can be viewed as building up the formats (e.g., translating the high level instructions from the main processor) on-the-fly in real-time (e.g., using firmware) and providing them to the one or more control engines.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM; however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
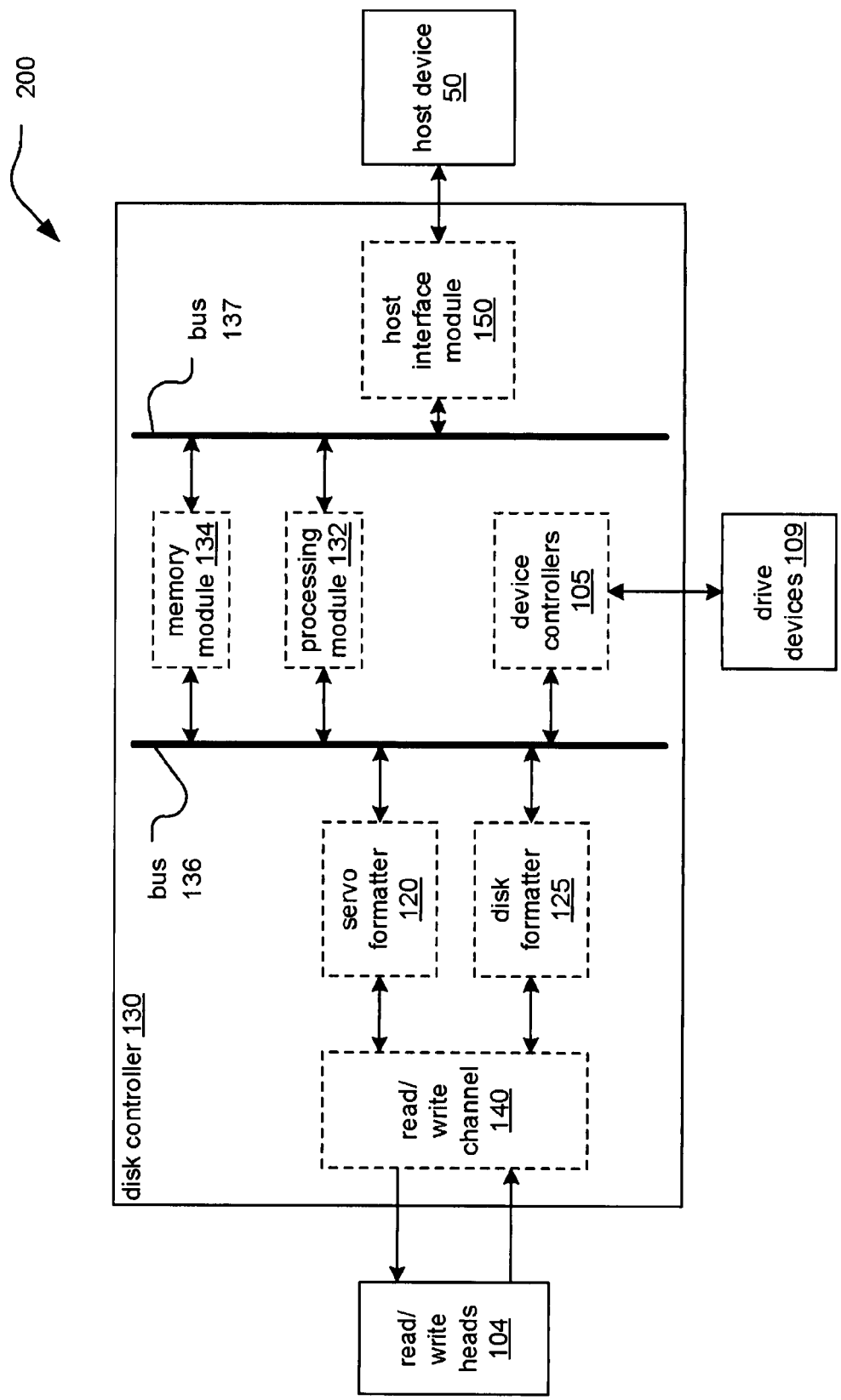
FIG. 2 illustrates an embodiment of an apparatus that includes a disk controller.

FIG. 2 illustrates an embodiment of an apparatus 200 that includes a disk controller 130. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102. Servo formatter 120 provides clock signals and other timing signals based on servo control data read from disk 102. Device controllers 105 control the operation of drive devices 109 such as actuator 108 and the servo motor, etc. Host interface 150 receives read and write commands from host device 50 and transmits data read from disk 102 along with other control information in accordance with a host interface protocol. In one embodiment, the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, and servo formatter 120 that are interconnected via bus 136 and bus 137. The host interface 150 can be connected to only the bus 137 and communicates with the host device 50. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in various embodiments.

In one possible embodiment, one or more modules of disk controller 130 are implemented as part of a system on a chip (SoC) integrated circuit. In an embodiment, this SoC integrated circuit includes a digital portion that can include additional modules such as protocol converters, linear block code encoding and decoding modules, etc., and an analog portion that includes device controllers 105 and optionally additional modules, such as a power supply, etc. In a further embodiment, the various functions and features of disk controller 130 are implemented in a plurality of integrated circuit devices that communicate and combine to perform the functionality of disk controller 130.

Figure 3:
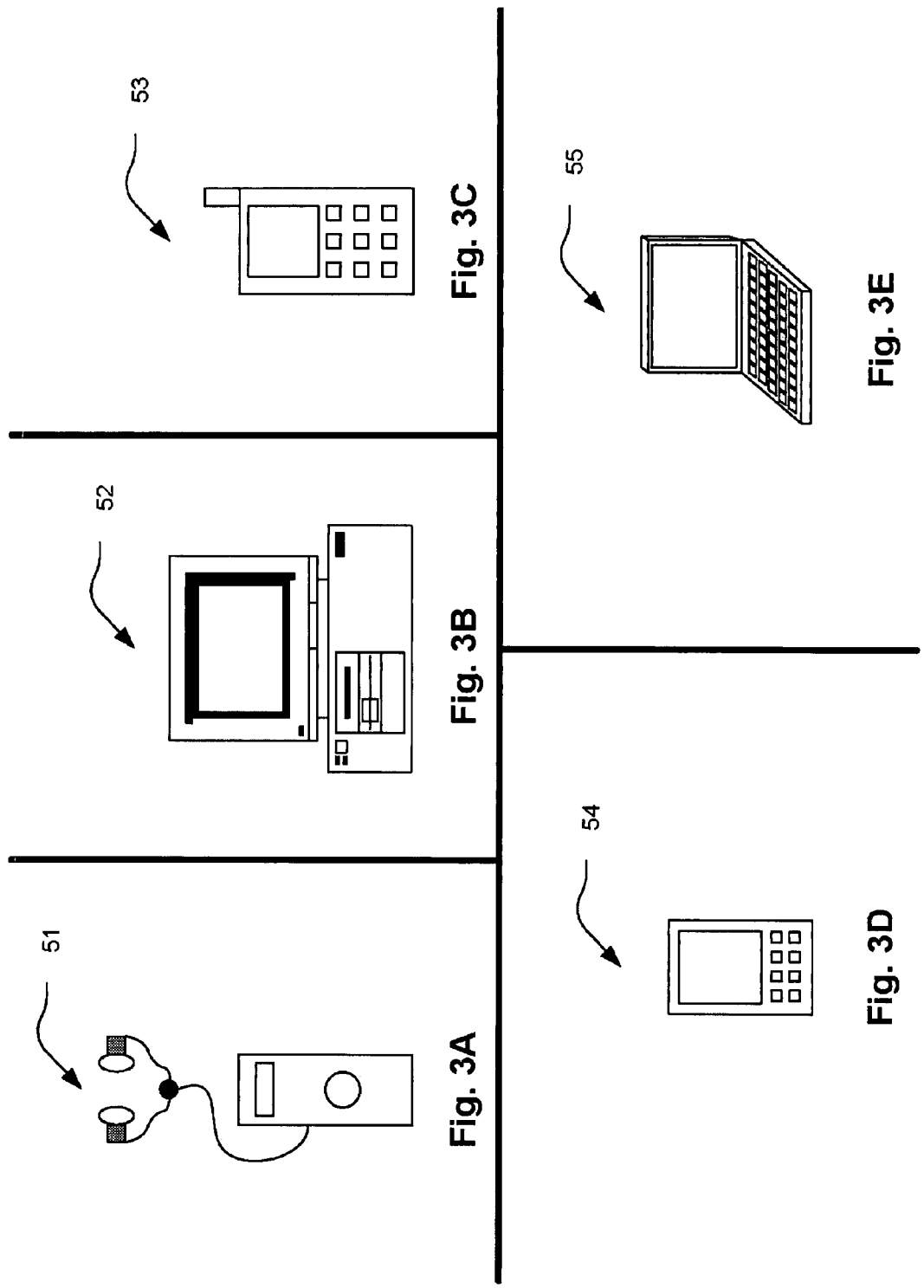
FIG. 3A illustrates an embodiment of a handheld audio unit.
FIG. 3B illustrates an embodiment of a computer.
FIG. 3C illustrates an embodiment of a wireless communication device.
FIG. 3D illustrates an embodiment of a personal digital assistant (PDA).
FIG. 3E illustrates an embodiment of a laptop computer.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3 ) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 4:
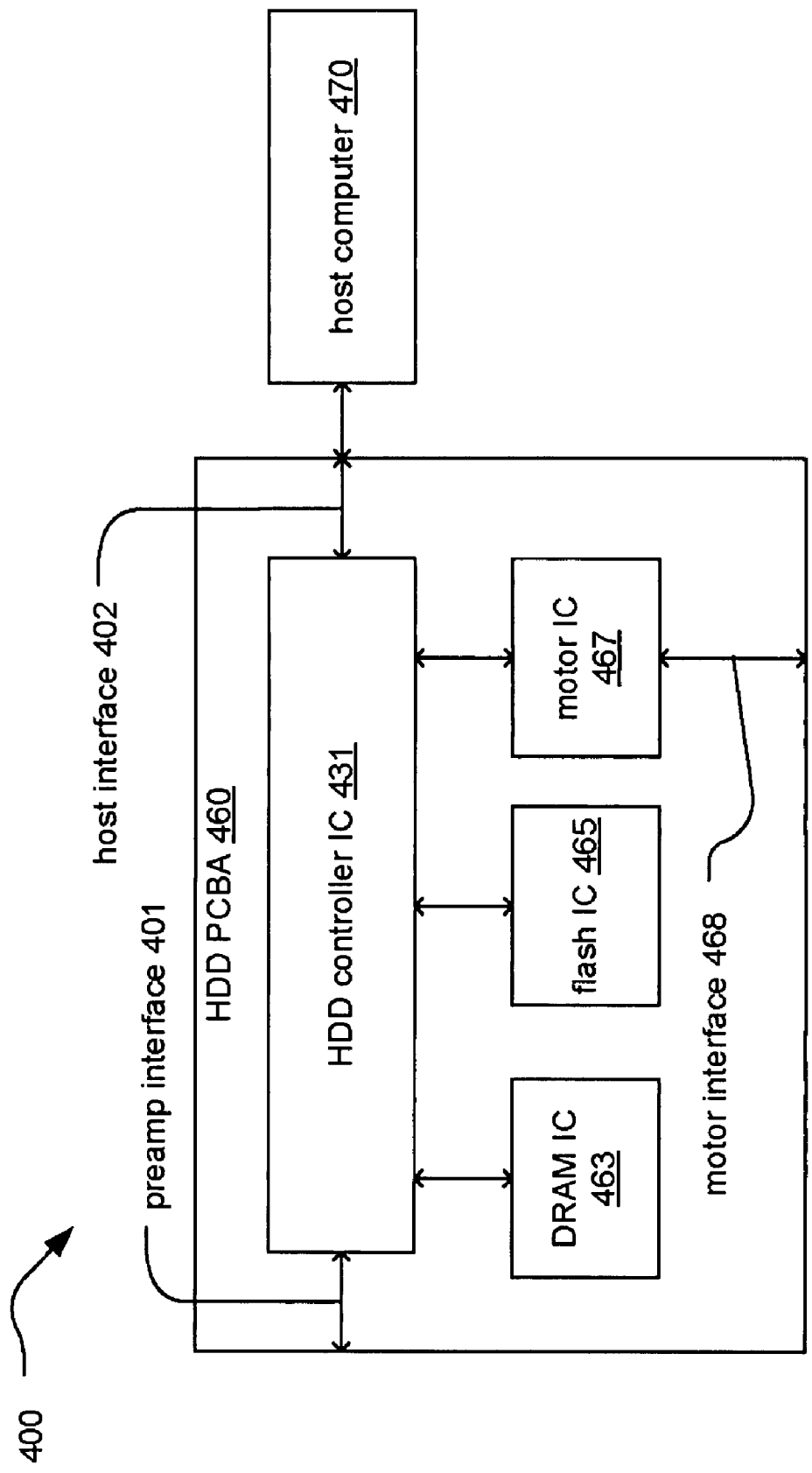
FIG. 4 illustrates an embodiment of an apparatus that includes a hard disk drive (HDD) printed circuit board assembly (PCBA).

FIG. 4 illustrates an embodiment of an apparatus 400 that includes a hard disk drive (HDD) printed circuit board assembly (PCBA). The apparatus 400 includes a HDD controller IC 431 that is operable to communicate with several other integrated circuits (ICs) and the host computer 470. The preamp interface 401 can be implemented to connect through a flex circuit to a preamp IC on the magnetic head assembly. The host interface 402 usually connects to the host computer 470 through a connector/cable assembly. The HDD controller IC 431 is operable to read and write locations in memory devices such as a DRAM and a flash ROM. The DRAM and flash ROM are shown as ICs, namely, as DRAM IC 463 and flash IC 465. The HDD controller IC 431 is operable to support communications with a motor controller IC 467 to manage the disk drive motors as well.

Figure 5:
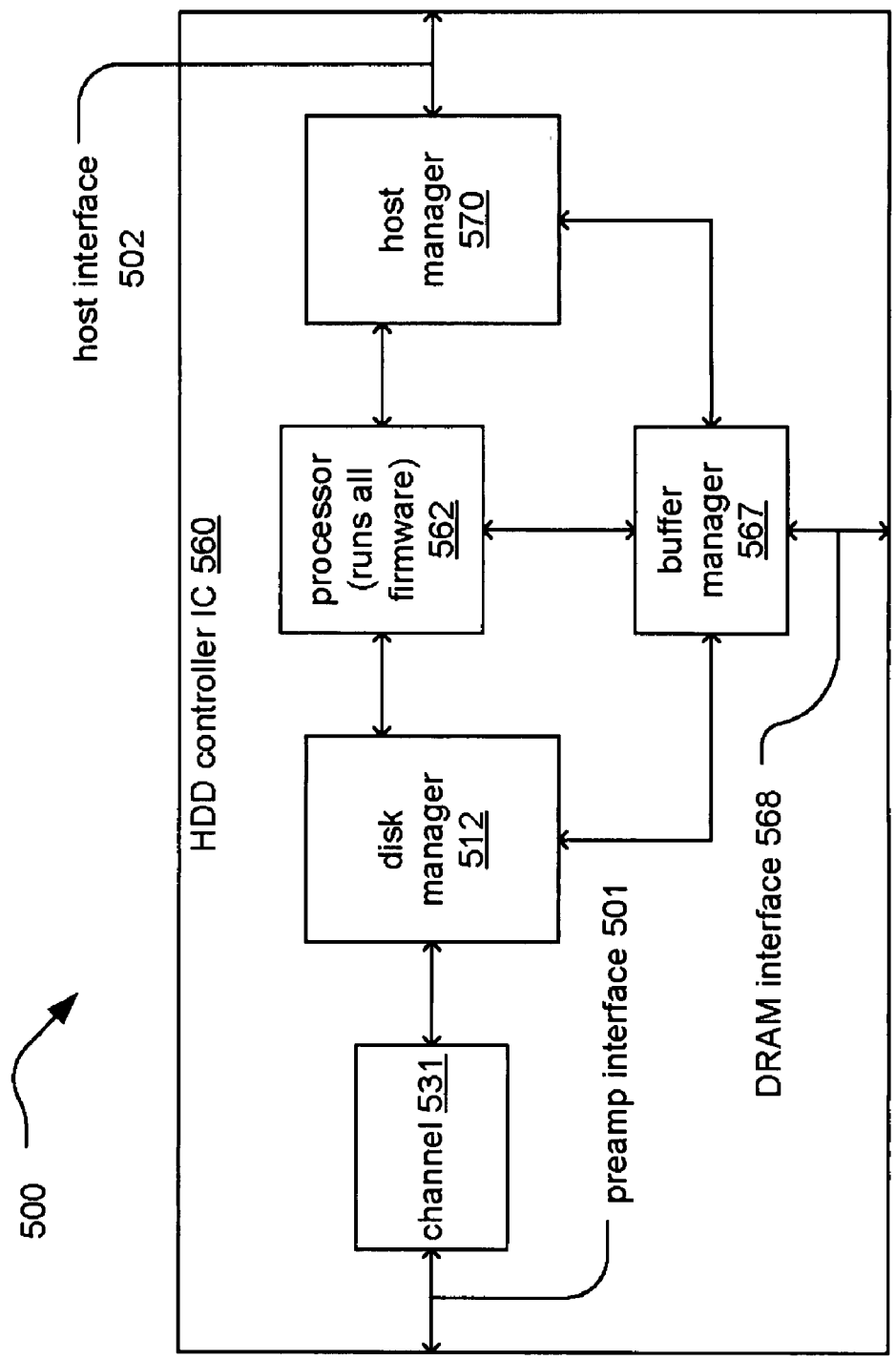
FIG. 5 illustrates a prior art embodiment of an apparatus that employs a single processor to service multiple control loops.

The prior art apparatus 500 of FIG. 5 is described above within the DESCRIPTION OF RELATED ART section. As can be seen within that diagram, the prior art approach to provisioning processing capability is to employ a single processor within an HDD controller IC 550.

Figure 6:
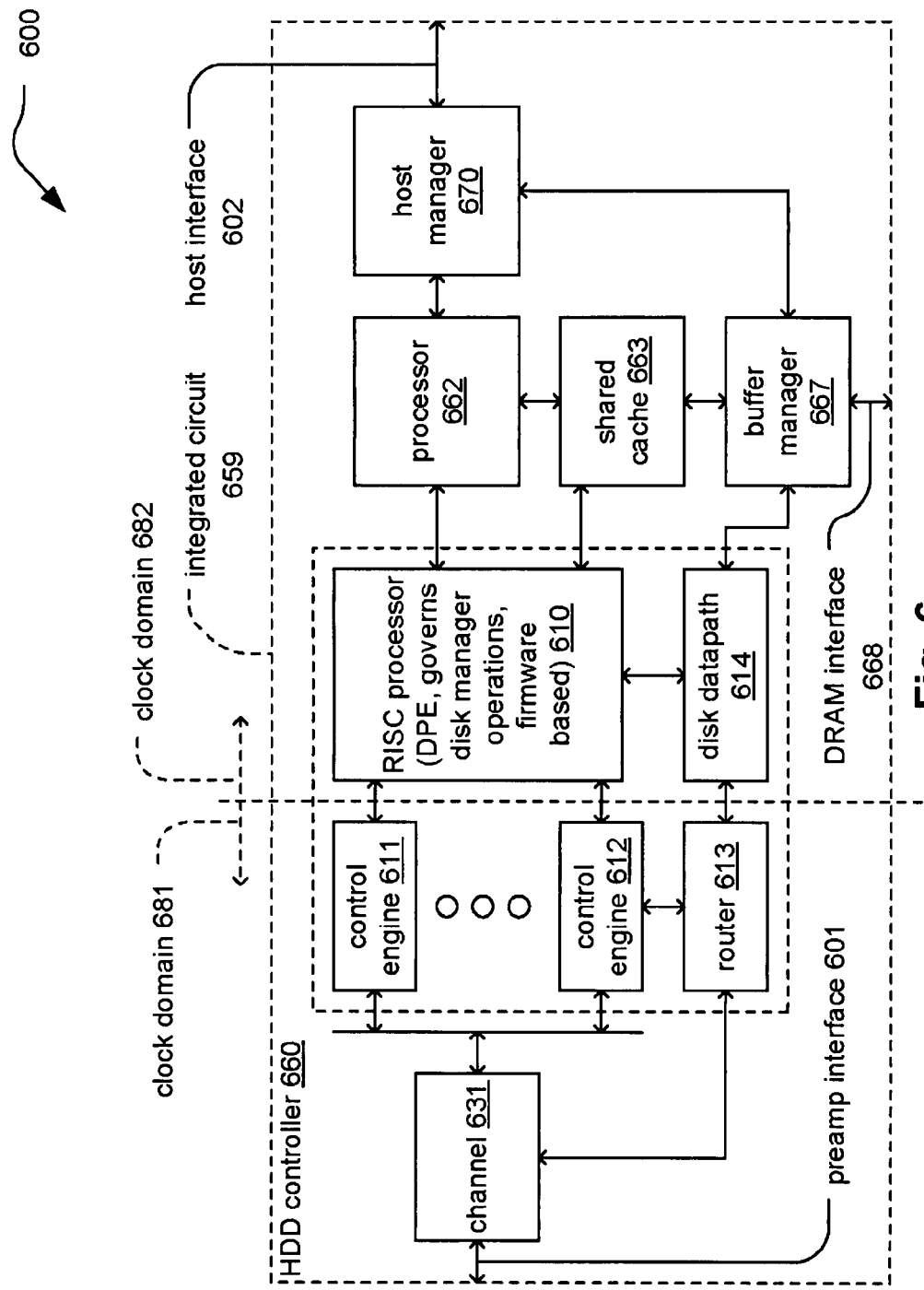
FIG. 6 illustrates an embodiment of an apparatus that employs a reduced instruction set computer (RISC) processor to govern disk manager operations and a main processor to perform other operations.

FIG. 6 illustrates an embodiment of an apparatus 600 that employs a reduced instruction set computer (RISC) processor to govern disk manager operations and a main processor 662 to perform operations other than disk manager related operations. This embodiment provides for a main processor 662 to provide higher level channel interfacing protocol control instructions to a RISC processor 610 that is operable to govern disk manager operations as implemented in firmware. The RISC processor 610 is operable to receive these higher level instructions from the main processor 662 and to translate them into bit level instructions that are then executed by one or more control engines (e.g., as shown by control engines 611-612). Also, a host manager module 670 interfaces with the main processor 662 to perform host interfacing protocol control functions.

Via the host manager module 670, the main processor 662 is operable to execute hard real-time control functions through the host interface 602. However, the executed, hard real-time control functions of the channel protocol control functions are performed by the RISC processor 710 with respect to the disk interface via the channel 631. Again, the higher level instructions are provided from the main processor 662, translated by the RISC processor 610 into bit level instructions, and then executed by the one or more control engines 611-612.

The implementation of a disk manager dedicated RISC processor 610 to off-load the main processor 662 allows the processor 662 to execute other non-channel related real-time control functions and background operations (e.g., background related firmware related functions). The main processor 662 interfaces with the RISC processor 610 through a direct connection and shared memory communications.

The apparatus 600 includes a HDD controller 660. The HDD controller 860 can be implemented as an IC 659, if desired. To facilitate inter-processor communication (e.g., between the main processor 662 and RISC processor 610), a shared data cache 663 is included in the apparatus 600. Each of the main processor 662 and RISC processor 610 can read and write shared structures (stored in the shared cache 663) to help manage the real-time functions performed by the main processor 662 and RISC processor 610. The shared data cache 663 provides for hardware-enforced coherency of these shared accesses.

A buffer manager module 667 is operable to arbitrate access to the shared data cache 663 and additional memory/buffers which can be implemented in DRAM via a DRAM interface 668 (such DRAM is typically external to such an HDD controller 660). The data path from the channel 631 is via a router 613 and a disk datapath module 614 to the buffer manager module 667. The operation of the router 613 is governed by one of the control engines (e.g., control engine 612), and the operation of the disk datapath module 614 is governed by the RISC processor 610.

It is also noted that the RISC processor 610 and the one or more control engines 611-612 can operate in accordance with different clock domains (e.g., the RISC processor 610 in accordance with clock domain 682 and the one or more control engines 611-612 in accordance with clock domain 681).

Figure 7:
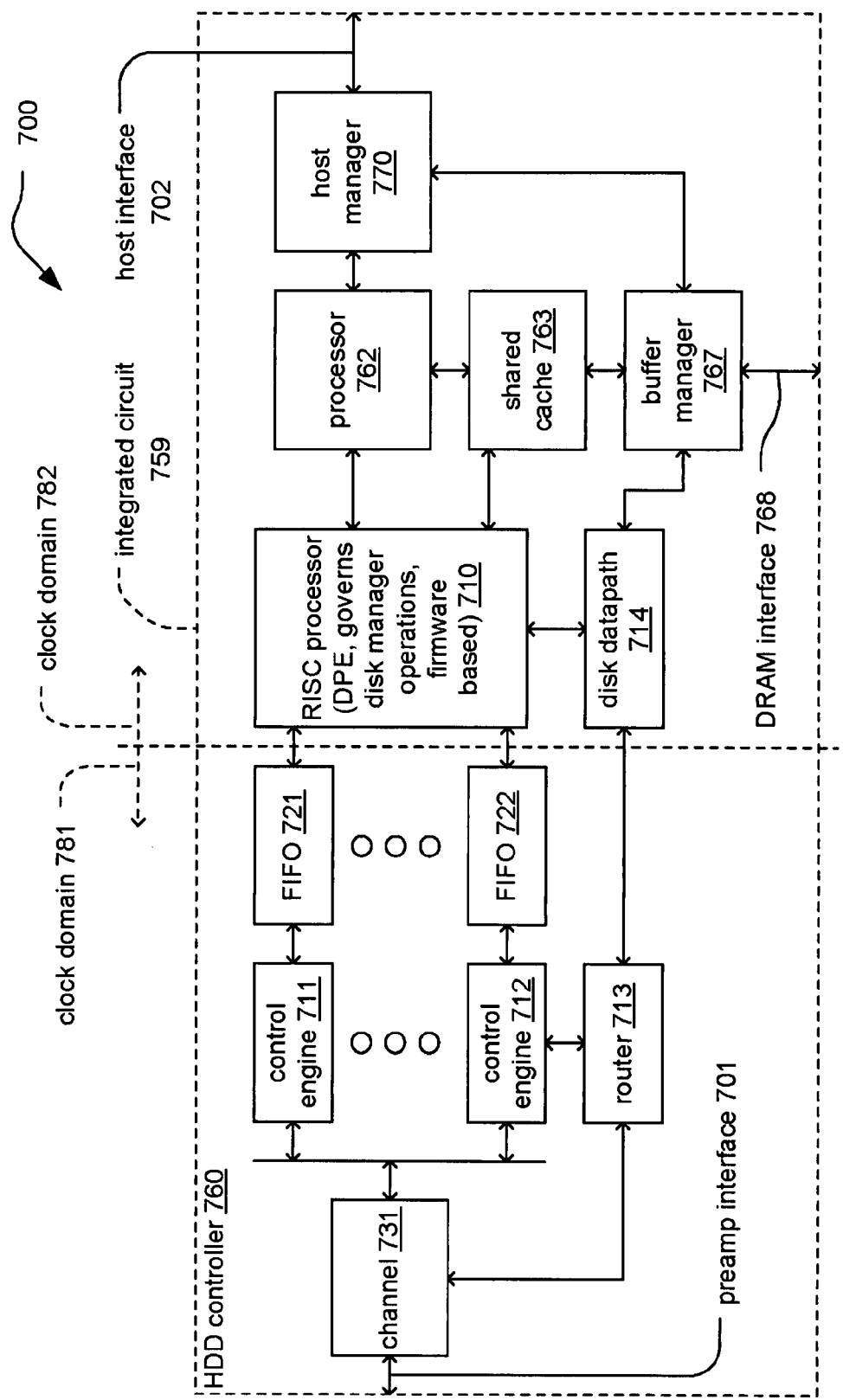
FIG. 7 and FIG. 8 illustrate alternative embodiments of an apparatus that employs a RISC processor to perform disk manager operations and a main processor to perform other operations.
Figure 8:
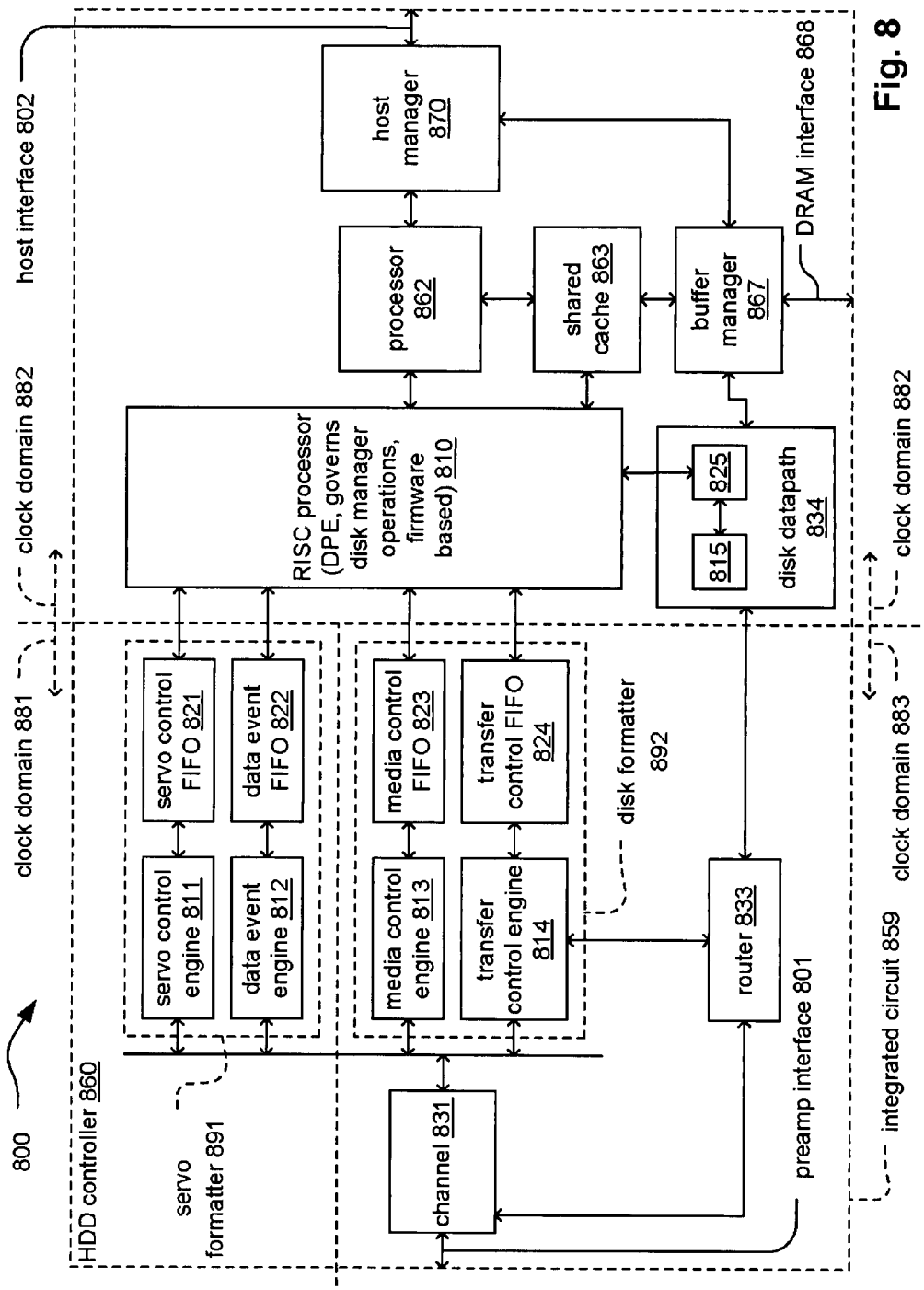

FIG. 7 and FIG. 8 illustrate alternative embodiments of an apparatus that employs a RISC processor to perform disk manager operations and a main processor to perform other operations.

Referring to the apparatus 700 of FIG. 7, this embodiment is analogous to the previous embodiment of FIG. 6, with at least one difference being that a first-in/first-out (FIFO) buffer (e.g., shown as FIFO 721-722) is implemented between each of one or more control engines 711-712.

Similar to the previous embodiment, this embodiment provides for a main processor 762 to provide higher level channel interfacing protocol control instructions to a RISC processor 710 that is operable to govern disk manager operations as implemented in firmware. The RISC processor 710 is operable to receive these higher level instructions from the main processor 762 and to translate them into bit level instructions that are then executed by one or more control engines (e.g., as shown by control engines 711-712). Also, a host manager module 770 interfaces with the main processor 762 to perform host interfacing protocol control functions.

Via the host manager module 770, the main processor 762 is operable to execute hard real-time control functions through the host interface 702. However, the executed, hard real-time control functions of the channel protocol control functions are performed by the RISC processor 710 with respect to the disk interface via the channel 731. Again, the higher level instructions are provided from the main processor 762, translated by the RISC processor 710 into bit level instructions which are then provided to FIFOs 721-722. The FIFOs 721-722 then provide the bit level instructions, in the order in which they are received, to the one or more control engines 711-712 where they are then executed for disk manager related functions.

The implementation of a disk manager dedicated RISC processor 710 to off-load the main processor 762 allows the processor 762 to execute other non-channel related real-time control functions and background operations (e.g., background related firmware related functions). The main processor 762 interfaces with the RISC processor 710 through a direct connection and shared memory communications.

The apparatus 700 includes a HDD controller 760. The HDD controller 860 can be implemented as an IC 759, if desired. To facilitate inter-processor communication (e.g., between the main processor 762 and RISC processor 710), a shared data cache 763 is included in the apparatus 700. Each of the main processor 762 and RISC processor 710 can read and write shared structures (stored in the shared cache 763) to help manage the real-time functions performed by the main processor 762 and RISC processor 710.

A buffer manager module 767 is operable to arbitrate access to the shared data cache 763 and additional memory/buffers which can be implemented in DRAM via a DRAM interface 768 (such DRAM is typically external to such an HDD controller 760). The data path from the channel 731 is via a router 713 and a disk datapath module 714 to the buffer manager module 767. The operation of the router 713 is governed by one of the control engines (e.g., control engine 712), and the operation of the disk datapath module 714 is governed by the RISC processor 710.

Again, the RISC processor 710 is operable to provide bit level instructions to each FIFO that is coupled to a control engine. There are a wide variety of operations that can be performed by these control engines with respect to disk manager related operations.

It is also noted that the RISC processor 710 and the one or more control engines 711-712 can operate in accordance with different clock domains (e.g., the RISC processor 710 in accordance with clock domain 782 and the one or more control engines 711-712 in accordance with clock domain 781).

Referring to the apparatus 800 of FIG. 8, similar to the previous embodiments, this embodiment provides for a main processor 862 to provide higher level channel interfacing protocol control instructions to a RISC processor 810 that is operable to govern disk manager operations as implemented in firmware. The RISC processor 810 is operable to receive these higher level instructions from the main processor 862 and to translate them into bit level instructions that are then executed by one or more control engines (e.g., shown in this embodiment as a servo control engine 811, a data event engine 812, a media control engine 813, a transfer control engine 814, and a buffer transfer control finite state machine (FSM) engine 815). Also, a host manager module 870 interfaces with the main processor 862 to perform host interfacing protocol control functions.

Via the host manager module 870, the main processor 862 is operable to execute hard real-time control functions through the host interface 802. However, the executed, hard real-time control functions of the channel protocol control functions are performed by the RISC processor 810 with respect to the disk interface via the channel 831. Again, the higher level instructions are provided from the main processor 862, translated by the RISC processor 810 into bit level instructions which are then provided to FIFOs 821-822. The FIFOs 821-822 then provide the bit level instructions, in the order in which they are received, to the servo control engine 811 and the data event engine 812, respectively, where they are then executed for each of these respective disk manager related functions. Similarly, the FIFOs 823, 824, and 825 then provide the bit level instructions, in the order in which they are received, the media control engine 813, the transfer control engine 814, and the buffer transfer control FSM engine 815, respectively, where they are then executed for each of these respective disk manager related functions.

The implementation of a disk manager dedicated RISC processor 810 to off-load the main processor 862 allows the processor 862 to execute other non-channel related real-time control functions and background operations (e.g., background related firmware related functions). The main processor 862 interfaces with the RISC processor 810 through a mailbox, interrupts, and shared cache communications.

The apparatus 800 includes a HDD controller 860. The HDD controller 860 can be implemented as an IC 859, if desired. To facilitate inter-processor communication (e.g., between the main processor 862 and RISC processor 810), a shared data cache 863 is included in the apparatus 800. Each of the main processor 862 and RISC processor 810 can read and write shared structures (stored in the shared cache 863) to help manage the real-time functions performed by the main processor 862 and RISC processor 810.

A buffer manager module 867 is operable to arbitrate access to the shared data cache 863 and additional memory/buffers which can be implemented in DRAM via a DRAM interface 868 (such DRAM is typically external to such an HDD controller 860). The data path from the channel 831 is via a router 833 and a disk datapath module 834 to the buffer manager module 867. The operation of the router 813 is governed by one of the control engines (e.g., buffer transfer control FSM engine 815), and the operation of the disk datapath module 834 is governed by the RISC processor 810.

Again, the RISC processor 810 is operable to provide bit level instructions to each FIFO that is coupled to a control engine. There are a wide variety of operations that can be performed by these control engines with respect to disk manager related operations.

For example, the servo control engine 811 is operable to perform functions including and related to servo media control functions based on servo control instructions (e.g., as originally provided as high level instructions from the main processor 862 and then translated into bit level instructions by the RISC processor 810). The servo control engine 811 is operable to perform basic servo formatting functionality generally at a channel control level. These servo control instructions can be timed by a servo timer in some embodiments. Also, the servo control engine 811 is operable to generate interrupts to the RISC processor 810 and the main processor 862.

The data event engine 812 is operable to provide strobes to a time disk formatter events based on data event instructions (e.g., as originally provided as high level instructions from the main processor 862 and then translated into bit level instructions by the RISC processor 810). These data event engines instructions can also be timed by the servo timer in some embodiments. The data event engine 812 is operable to performing the timing of disk formatting based on delays from servo address marks (SAMs). This is the timing at the start of a disk transfer operation based on the servo clock delay from the SAM.

In some embodiments, the servo control engine 811 and the data event engine 812 can be viewed as being implemented in servo formatter functionality of the device.

The media control engine 813 is operable to perform disk media control functions based on format field elements and be timed by wedge-to-wedge counter (e.g., as in an HDD application). The transfer control engine 814 is operable to perform data transfer control functions based on format field elements and be timed by channel control. The operations of the media control engine 813 and the transfer control engine 814 generally relate to disk transfer and media control to and from the channel. The transfer control engine 814 is operable to perform data transfer operations to move data between the channel and an internal sector buffer.

The buffer transfer control FSM engine 815 is operable to perform data transfer operations to move data between the arbitrated sector buffer and a buffer manager (e.g., such as the buffer manager 867).

In some embodiments, the servo control engine 811 and the data event engine 812 can be viewed as being implemented in disk formatter functionality of the device.

It is also noted that the RISC processor 810 and the one or more control engines 811-812 can operate in accordance with different clock domains (e.g., (1) the RISC processor 810 and the buffer transfer control FSM engine 815 in accordance with clock domain 882, (2) the servo control engine 811 and the data event engine 812 in accordance with clock domain 881, and (3) the media control engine 813, and the transfer control engine 814 in accordance with clock domain 883).

It is also noted the novel approach of employing a RISC processor dedicated to disk manager related functions allows for much more diagnostics than allowed using prior art approaches. For example, an FCC test can be performed internally within a device using implemented in accordance with certain aspects of the invention by programming it differently (e.g., modifying its firmware).

Though this list is not exhaustive, some of the benefits of certain aspects of the invention provide for the capability to be adaptable to a variety of different types of main processors. For example, because the RISC processors employed herein are firmware based, different types of firmware can be provisioned when dealing with different main processors in a given embodiment. Also, because of this approach to disk manager operations within the RISC processor is firmware based, it is much easier to perform de-bugging when implementing a hardware solution. In contradistinction to prior art systems which are largely hardware based, the firmware-based lower level interaction of the novel approach presented herein allows a great deal of flexibility in not only design but also de-bugging of a hardware solution. Generally speaking as well, the disk manager specific functions can operate much more effectively because of this dedicated RISC processor that is capable of handling all of these disk manager specific functions (e.g., as compared to prior art approaches than employ the main processor to do them).

This novel architecture is more scaleable, flexible, and adaptable than prior art disk manager architectures. In addition, this novel architecture provides a means to fix hardware bugs more easily in real-time than other systems. Also, it provides the ability to add new features with firmware that would otherwise require hardware modification. A number of variations can also be employed without departing from the scope and spirit of the invention including, though not limited to, (1) modifying the architecture and memory configuration of the RISC processor, (2) changing the number and function of the various FIFO-based hardware engines, (3) employing different architecture and instruction definitions of the hardware engines, and/or (4) employing a different The interface between the RISC processor and the rest of the HDD controller.

Figure 9:
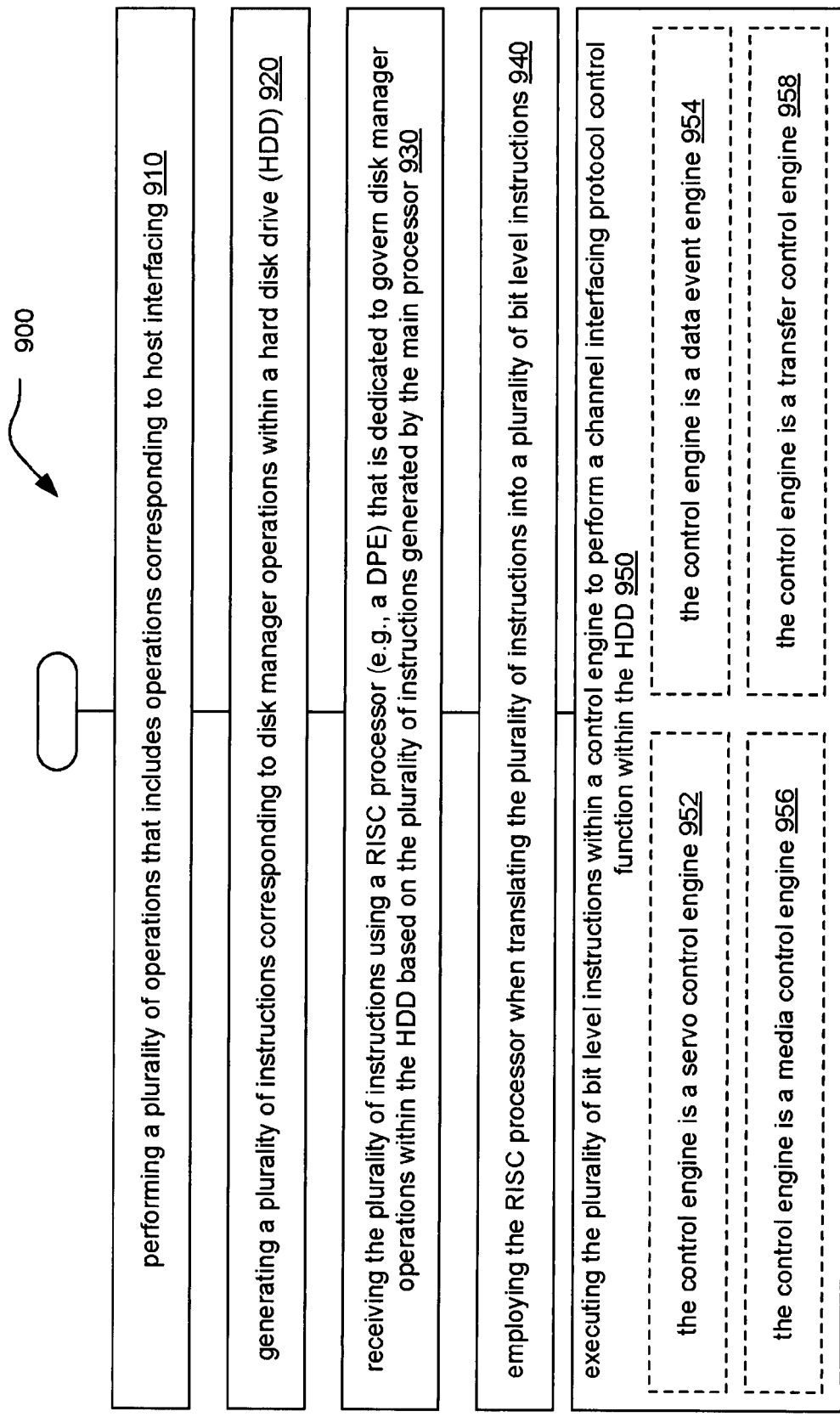
FIG. 9 illustrates an embodiment of a method performed within a hard disk drive (HDD) that involves employing a RISC processor to govern disk manager operations within the HDD.

FIG. 9 illustrates an embodiment of a method 900 performed within a hard disk drive (HDD) that involves employing a RISC processor to govern disk manager operations within the HDD. The method 900 begins by performing a plurality of operations that includes operations corresponding to host interfacing, as shown in a block 910. The method 900 continues by generating a plurality of instructions corresponding to disk manager operations within a hard disk drive (HDD), as shown in a block 920. The method 900 continues by receiving the plurality of instructions using a RISC processor that is dedicated to govern disk manager operations within the HDD based on the plurality of instructions generated by the main processor, as shown in a block 930. The RISC processor can be viewed as being a disk protocol engine (DPE) in some embodiments. The method 900 continues by employing the RISC processor when translating the plurality of instructions into a plurality of bit level instructions, as shown in a block 940. The method 900 continues by executing the plurality of bit level instructions within a control engine to perform a channel interfacing protocol control function within the HDD, as shown in a block 950. It is noted that a variety of channel interfacing protocol control functions can be performed in accordance with the method 900. For example, in some embodiments, the control engine used to perform the low level channel servo-related function within the HDD is a servo control engine, as shown in a block 952. Alternatively, the control engine used to perform the timing for data related control function within the HDD is a data event engine, as shown in a block 954. In even other embodiments, the control engine used to perform channel media-related function within the HDD is a media control engine, as shown in a block 956. In even another embodiment, the control engine used to perform data transfer between the channel and the controller within the HDD is a transfer control engine, as shown in a block 958. Clearly, other types of control engines can be employed as well without departing from the scope and spirit of the invention.

It is noted that the various modules (e.g., processors, manager modules, engines, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An apparatus, comprising:
   a main processor that is operable to:
      perform a plurality of operations that includes operations corresponding to host interfacing; and
      generate a plurality of instructions corresponding to disk manager operations within a hard disk drive (HDD);
   a reduced instruction set computer (RISC) processor, dedicated to govern disk manager operations within the HDD based on the plurality of instructions generated by the main processor, that is operable to:
      receive the plurality of instructions from the main processor; and
      translate the plurality of instructions into a plurality of bit level instructions;
   a control engine that is operable to execute the plurality of bit level instructions to perform a channel interfacing protocol control function within the HDD; and
   a router, controlled by the control engine, that is operable to support a datapath to and from the channel of the HDD by which data is read from and written to storage media of the HDD.

2. The apparatus of claim 1, wherein:
   the control engine is one of a media control engine, a transfer control engine, a data event engine, a servo control engine, and a buffer transfer control finite state machine (FSM) engine.

3. The apparatus of claim 1, wherein:
   the plurality of instructions includes a plurality of servo related instructions that governs operation of a servo control loop within the HDD;
   the RISC processor is operable to:
      receive the plurality of servo related instructions from the main processor; and
      translate the plurality of servo related instructions into a plurality of bit level servo related instructions; and
   the control engine is a servo control engine that is operable to receive and execute the plurality of bit level servo related instructions to govern low level timing for servo demodulation within the HDD.

4. The apparatus of claim 1, wherein:
   the plurality of instructions includes a plurality of data event related instructions that governs operation of a transfer of data to or from the storage media of the HDD;
   the RISC processor is operable to:
      receive the plurality of data event related instructions from the main processor; and
      translate the plurality of data event related instructions into a plurality of bit level data event related instructions; and
   the control engine is a data event engine that is operable to receive and execute the plurality of bit level servo related instructions to govern timing of data formatting based on a delay from a servo address mark within the HDD.

5. The apparatus of claim 1, further comprising:
   a control first-in/first-out (FIFO) buffer that is operable to:
      receive the plurality of bit level instructions from the RISC processor;
      store the plurality of bit level instructions; and
      provide the plurality of bit level instructions to the control engine.

6. The apparatus of claim 1, wherein:
   the RISC processor operates within a first clock domain; and
   the control engine operates within a second clock domain.

7. The apparatus of claim 1, further comprising:
   a control first-in/first-out (FIFO) buffer that is operable to:
      receive the plurality of bit level instructions from the RISC processor;
      store the plurality of bit level instructions; and
      provide the plurality of bit level instructions to the control engine; and wherein:
   the RISC processor operates within a first clock domain; and
   the control engine and the FIFO buffer operate within a second clock domain.

8. The apparatus of claim 1, wherein:
   the RISC processor is operable to employ firmware to govern disk manager operations within the HDD.

9. The apparatus of claim 1, wherein:
   the main processor is operable to perform the plurality of operations that includes operations corresponding to host interfacing in real time.

10. The apparatus of claim 1, further comprising:
    a shared cache that couples to the main processor and the RISC processor; and wherein:
    the shared cache is directly connected to the main processor; and
    the shared cache is directly connected to the RISC processor.

11. The apparatus of claim 1, further comprising:
    a shared cache that couples to the main processor and the RISC processor; and
    a buffer manager module, coupled to the shared cache and also coupled to each of the main processor and the RISC processor, that is operable to arbitrate and manage shared access of each of the main processor and the RISC processor to the shared cache.

12. An apparatus, comprising:
    a main processor that is operable to:

perform a plurality of operations that includes operations corresponding to host interfacing; and
generate a plurality of instructions corresponding to disk manager operations within a hard disk drive (HDD);
a reduced instruction set computer (RISC) processor, dedicated to govern disk manager operations within the HDD based on the plurality of instructions generated by the main processor, that is operable to:
receive the plurality of instructions from the main processor; and
translate the plurality of instructions into at least one of a first plurality of bit level instructions and a second plurality of bit level instructions; and
a servo control engine that is operable to receive and execute the first plurality of bit level instructions to govern low level timing for servo demodulation within the HDD;
a data event engine that is operable to receive and execute the second plurality of bit level instructions to govern timing of data formatting based on a delay from a servo address mark within the HDD; and
a router, controlled by a transfer control engine, that is operable to support a datapath with a channel of the HDD by which data is read from and written to storage media of the HDD.

13. The apparatus of claim 12, further comprising:
a servo control first-in/first-out (FIFO) buffer that is operable to:
receive the first plurality of bit level instructions from the RISC processor;
store the first plurality of bit level instructions; and
provide the first plurality of bit level instructions to the servo control engine.

14. The apparatus of claim 12, further comprising:
a data event first-in/first-out (FIFO) buffer that is operable to:
receive the second plurality of bit level instructions from the RISC processor;
store the second plurality of bit level instructions; and
provide the second plurality of bit level instructions to the servo control engine.

15. The apparatus of claim 12, wherein:
the RISC processor operates within a first clock domain; and
the servo control engine and the data event engine operate within a second clock domain.

16. The apparatus of claim 12, wherein:
the RISC processor is operable to:
receive at least one additional plurality of instructions from the main processor; and
translate the at least one additional plurality of instructions into at least one of a third plurality of bit level instructions, a fourth plurality of bit level instructions, and a fifth plurality of bit level instructions; and further comprising:

a shared cache that couples to the main processor and the RISC processor; and
a buffer manager module, coupled to the shared cache and also coupled to each of the main processor and the RISC processor, that is operable to arbitrate and manage shared access of each of the main processor and the RISC processor to the shared cache;
a media control engine that is operable to receive and execute the third plurality of bit level instructions to govern disk formatting related functions of the HDD;
the transfer control engine that is operable to receive and execute the fourth plurality of bit level instructions to govern transfer of data between a read channel that couples to the storage media of the HDD and an arbitrated sector buffer of the HDD; and
a buffer transfer control finite state machine (FSM) engine that is operable to receive and execute the fifth plurality of bit level instructions to govern the transfer of data between the arbitrated sector buffer of the HDD and the buffer manager module.

17. A method performed within a hard disk drive (HDD), the method comprising:
performing a plurality of operations that includes operations corresponding to host interfacing;
generating a plurality of instructions corresponding to disk manager operations within the HDD;
within a reduced instruction set computer (RISC) processor, that is dedicated to govern disk manager operations within the HDD based on the plurality of instructions generated by the main processor:
receiving the plurality of instructions; and
translating the plurality of instructions into a plurality of bit level instructions;
executing the plurality of bit level instructions within a control engine to perform a channel interfacing protocol control function within the HDD; and
using a transfer control engine for controlling a router that is operable to support a datapath with a channel of the HDD by which data is read from and written to storage media of the HDD.

18. The method of claim 17, wherein:
the RISC processor operates within a first clock domain; and
the control engine operates within a second clock domain.

19. The method of claim 17, wherein:
the control engine is a servo control engine that is operable to receive and execute the plurality of bit level instructions to govern low level timing for servo demodulation within the HDD.

20. The method of claim 17, wherein:
the control engine is a data event engine that is operable to receive and execute the plurality of bit level instructions to govern timing of data formatting based on a delay from a servo address mark within the HDD.

* * * * *